United States Patent [19]

Ishizaka et al.

[11] Patent Number: 4,561,741

[45] Date of Patent: Dec. 31, 1985

[54] CAMERA FILM FEED CONTROL APPARATUS

[75] Inventors: Sunao Ishizaka; Osamu Maida, both of Tokyo, Japan

[73] Assignee: Nippon Kogaku K.K., Tokyo, Japan

[21] Appl. No.: 636,553

[22] Filed: Aug. 1, 1984

[30] Foreign Application Priority Data

Aug. 10, 1983 [JP] Japan ................................ 58-145071

[51] Int. Cl.⁴ ......................... G03B 1/60; G03B 17/36
[52] U.S. Cl. ...................................... 354/21; 354/214; 354/217
[58] Field of Search ................. 354/21, 212, 213, 214, 354/217, 218

[56] References Cited

U.S. PATENT DOCUMENTS 4,021,828  5/1977  Iura et al. ............................ 354/217
4,299,466  11/1981  Harvey ................................ 354/217

Primary Examiner—Russell E. Adams
Attorney, Agent, or Firm—Fitzpatrick, Cella, Harper & Scinto

[57] ABSTRACT

A film feed control apparatus generates an output signal for instructing the rewinding of the film when a wind operation for a frame of a film is stopped before it is completed and the number of exposed frames has exceeded a nominal number of exposures. The film feed control apparatus stops the power supply to a wind motor when the wind operation is stopped before the number of exposed frames reaches the nominal number of exposures.

8 Claims, 1 Drawing Figure

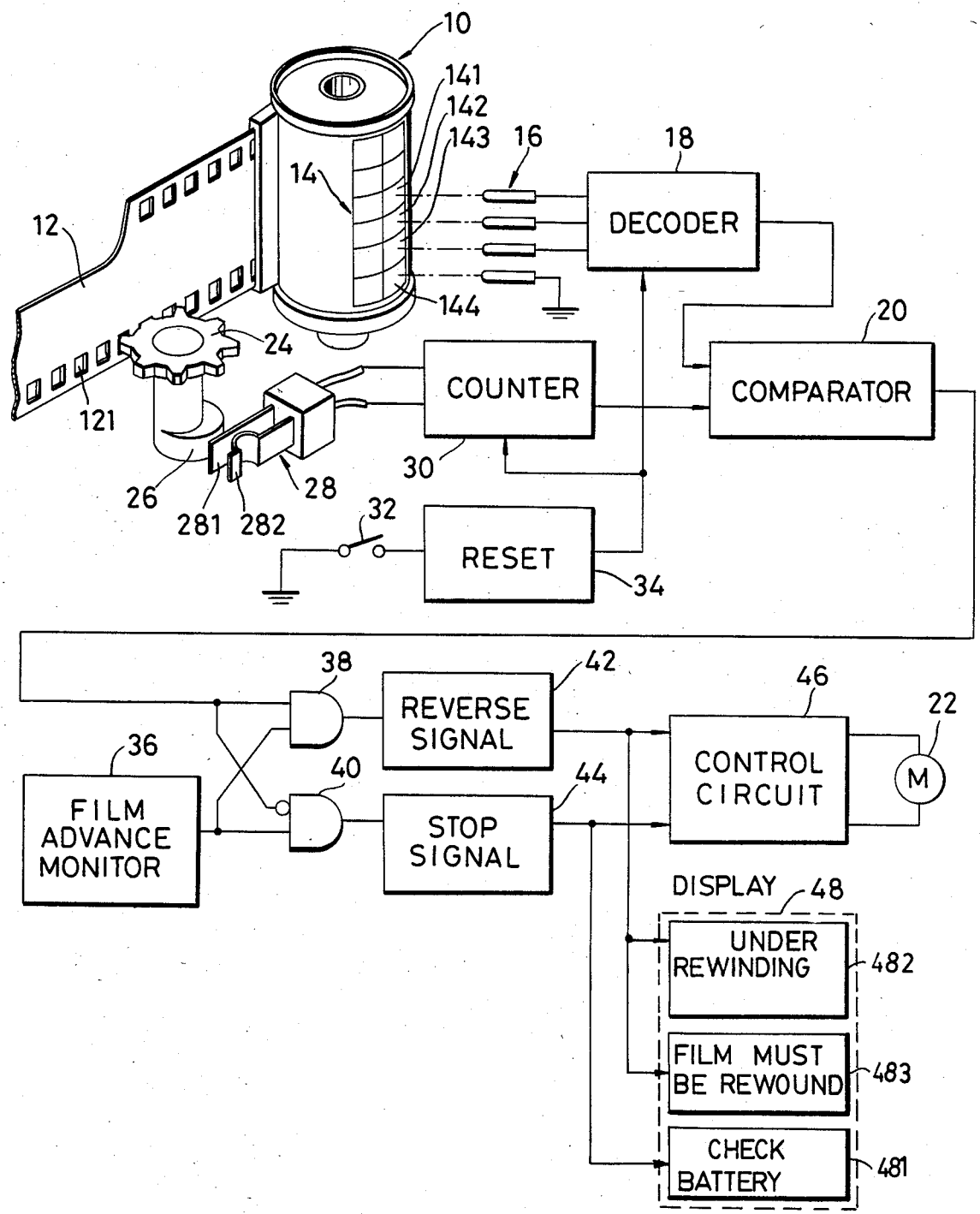

CAMERA FILM FEED CONTROL APPARATUS

BACKGROUND OF THE INVENTION

The present invention relates to a film feed control apparatus of a still camera, and more particularly, to a film feed control apparatus of a still camera having a mechanism for detecting information concerning a film provided on a film, a film magazine, a film cassette or a film cartridge.

In still cameras in which a film must be rewound when the film from a film feed chamber has been wound and exposed, some cameras are known to have a film rewinding mechanism for automatically rewinding a film after exposure of a roll of the film is completely finished.

Various types of cameras having such a mechanism are conventionally known. For example, one type of camera having a timer for measuring a time while a film wind motor is enabled is known. In this camera, when the wind motor is not disabled after a predetermined time necessary for winding a unit length (e.g., a frame or a pitch of perforations) of a film is exceeded, the film rewind operation is automatically started. This is generally caused when a rotation of the motor is prevented during film winding and the rotation velocity thereof is decreased, or when the total length of a film to be taken up from a film cartridge, for example, has been wound and the rotation of the motor is thereby stopped.

In another type of a camera which detects a current which flows into a motor, when an excessive current flows into the motor, the film rewind operation is automatically started. An excessive current flow to the motor is caused when the motor is forcibly stopped during its ON period. This may be caused when the total length of the film to be taken up from a film magazine has been wound as described above.

However, in both types of cameras, another reason preventing the rotation of the motor is plausible. For example, when the temperature is low, a battery voltage is lowered, thereby prolonging a time necessary for winding a frame of a film. For this reason, the former type of camera has a problem in that the film rewind operation is started even if an unexposed frame of film remains in the film magazine.

For example, when a film, film maganize, cassette or cartridge has a malfunction and the wind operation is not smoothly performed, the rotation of the motor is temporarily stopped. In this case, in the latter type of camera, a current flowing to the motor temporarily becomes excessive and the film rewind operation is thereby started.

Still another type of a camera is known wherein the number of film frames exposed is counted when wound by a winding device, and when the counted number reaches a nominal number of exposures guaranteed for the film, the film rewind operation is automatically started regardless of the condition of the wound film. However, a film generally has an extra length for two or three exposures in addition to the nominal number of exposures. In this case, in a camera of this type, only exposures of a nominal number can be performed, but additional exposures as described above cannot be performed.

SUMMARY OF THE INVENTION

It is a main object of the present invention to provide an improved film feed control apparatus for a still camera.

It is another object of the present invention to provide a camera which can perform improved film feed control wherein problems of various types of conventional cameras are resolved and a film is subjected to exposure until the complete length of a film is wound from a film magazine, cassette, or cartridge.

In a film feed control apparatus according to the present invention, an output signal for instructing the rewinding of the film is generated when a wind operation for a frame of a film is stopped before it is completed and the number of exposed frames has exceeded a nominal number of exposures; and power supply to a wind motor is stopped when the wind operation is stopped before the number of exposed frames reaches the nominal number of exposures.

In an aspect of the present invention, the output signal instructing rewinding of the film is supplied to a motor control circuit to drive the motor for automatic rewinding, thereby providing an automatic rewind camera.

In another aspect of the present invention, the output is supplied to a display circuit to indicate that the film rewind operation is being performed.

BRIEF DESCRIPTION OF THE DRAWING

The drawing shows a block diagram of a film feed control apparatus of a camera according to an embodiment of the present invention.

DETAILED DESCRIPTION OF THE PREFERRED EMBODIMENT

A roll film used in an embodiment shown in the drawing is stored in a cartridge 10. A series of laterally spaced electrically conductive contacts 14 are provided on the outer wall of the cartridge 10. The contacts 14 are selectively coated with an insulator, thereby providing a pattern array having conductive and non-conductive portions. The pattern array constitutes digital codes which represent a film speed, the number of exposures and latitude of a film 12. Four contacts 141, 142, 143 and 144 among the contacts 14 constitute a digital code which represents information such as a nominal number of exposures of the film 12. This nominal number of exposures is a minimum number of frames which can be exposed. This digital code is detected by a plurality of contact pins 16 which are in contact with the side surface of the cartridge 10 stored in a film chamber of the camera (not shown). A method for forming a film cartridge having such a digital code, or for detecting such a digital code is described in detail in, for example, U.S. Pat. No. 4,173,401. The digital code detected by the contact pins 16 is supplied to a decoder 18 to be converted into an electric signal which represents a nominal number of exposures, and the converted signal is supplied to a comparator 20.

A feed mechanism (not shown) driven by an electric motor 22 upon exposure takes up the film 12 from the cartridge 10 and winds it around a spool (not shown). A wind length upon one exposrue corresponds to that of eight perforations 121 provided along the longitudinal direction of the film 12. Therefore, this wind length also corresponds to one rotation of a free sprocket 24 having eight teeth respectively engaged in the perforations 121.

When the sprocket 24 is rotated once, a cam surface 26 coaxially provided with the sprocket 24 pushes one contact 281 of a switch 28 connected to a counter 30 so as to bring it into contact with the other contact 282. A count number of the counter 30 is increased by one every time the switch 28 is closed. Therefore, the count number of the counter 30 corresponds to the number of exposures of the film 12. The count number is supplied to the comparator 20. When the count number of the exposures reaches the nominal number thereof, the comparator 20 inverts an output thereof from L level to H level. When a rear cover of the camera (not shown) is opened, a switch 32 is turned on, and when it is closed, the switch 32 is turned off. When the switch 32 is turned on, a reset circuit 34 resets the counter 30 and the decoder 18. When the switch 32 is turned off, the reset circuit 34 releases the reset state of the counter 30 and the decoder 18. A film advance monitor 36 detects any abnormal feed by the feed mechanism occurring during winding the film 12 after every exposure, and generates an H level output. A timer as described in, for example, U.S. Pat. No. 4,340,289 or U.S. Pat. No. 4,353,633 for measuring a conductive time of a wind motor can be used as the monitor 36. In this case, when power supply to the motor is not stopped after a predetermined time interval necessary for winding a frame of a film and counted by the timer is exceeded, an abnormal detection signal of H level is generated. As another example of the monitor 36, a current detector can be used to detect a current which flows to the motor, and to generate an abnormal detection signal of H level when such an excessive current flows into the motor.

In this manner, the film advance monitor 36 detects an abnormal state such as an interruption of a film feed during winding and generates a detection signal of H level irrespective of whether or not the film 12 has been completely taken up.

The detection signal is supplied to one input terminal of each of AND gates 38 and 40, the other input terminal of each of which receives the output signal and the inverted output signal from the comparator 20, respectively.

A reverse signal generating circuit 42 generates an output signal of L level in response to the output signal of H level from the AND gate 38, thereby rotating the motor 22 in the reverse direction through a motor control circuit 46. Then, the film 12, which has been fed in the wind direction, is immediately reversed to be fed in the rewind direction.

A stop signal generating circuit 44 generates an output signal of L level in response to the output signal of H level from the AND gate 40, thereby stopping the rotation of the motor 22 through the motor control circuit 46.

A bridge circuit described in, e.g., U.S. Pat No. 4,319,171 having semiconductor switching elements can be used as the motor control circuit which is capable of the above operation.

Assume that a photograph is taken by using a camera according to the present invention. In this case, when the exposed number of the film has not reached the nominal number of exposures ( i.e., an unexposed film portion remains in the cartridge 10), the output signal of L level from the comparator 20 enables the AND gate 40. Therefore, when feeding of the film 12 has not failed, the film feed continues. However, when the monitor 36 detects an abnormality, the output signal of H level from the monitor 36 operates the stop signal generating circuit 44 through the AND gate 40, whereby a motor controlling circuit 46 stops the rotation of the motor 22.

The stop signal from the stop signal generating circuit 44 is supplied to a display 48 so as to indicate a need for checking batteries by a visual or audio means in a display portion 482, thereby informing the cause for stopping the motor 22 to an operator.

When the exposed number of the film exceeds the nominal number of exposures (i.e., almost no unexposed film remains in the cartridge 10), the output signal of H level from the comparator 20 enables the AND gate 38. In this state when the film feed has not failed, the film feed continues and more exposures can be performed exceeding the nominal number of exposures. When the monitor 36 detects an abnormality, the output signal of H level from the monitor 36 operates the reverse signal generating circuit 42 through the AND gate 38, whereby a motor controlled circuit 46 rotates the motor 22 in the reverse direction. Therefore, the automatic rewind of the film can be performed.

The reverse signal from the reverse signal generating circuit 42 can be supplied to the display 48 so as to indicate to the operator that the film 12 is subjected to the rewind operation and that all the exposures have been made. If the display 48 can display, at a display portion 483 that the film 12 must be rewound, the operator can manually perform the rewind operation. This feature is advantageous for a camera which has no automatic rewind mechanism.

We claim:

1. In a camera in which a cartridge, on which information representing a nominal number of exposures of a film roll in the cartridge is formed, can be used, and feed means for winding one frame of said film roll upon each exposure by means of an electric motor is provided, an apparatus for controlling said feed means, comprising:
    (a) detecting means for detecting said information on said cartridge;
    (b) counting means for counting the number of the frames of said film roll wound by said feed means;
    (c) comparing means for generating a comparison output signal when the number of the frames counted by said counting means exceeds said nominal number of the exposures included in said information detected by said detecting means;
    (d) monitor means for monitoring a wind state of said film roll wound by said feed means, and for generating a detection output signal upon detecting an abnormal wind state, said monitor means monitoring a current which flows to said electric motor and generating said detection output signal when said monitored current exceeds a predetermined value; and
    (e) control means responsive to said comparing means and said monitor means for generating a first output signal instructing rewinding of said film roll in said cartridge when said detection output signal is generated while said comparison output signal is generated and for generating a second output signal instructing stopping of rotation of said electric motor when said detection output signal is generated while said comparison output signal is not generated.

2. In a camera in which a cartridge, on which information representing a nominal number of exposures of a film roll in the cartridge is formed, can be used, and feed means for winding one frame of said film roll upon each exposure by means of an electric motor is provided, an apparatus for controlling said feed means, comprising:

(a) detecting means for detecting said information on said cartridge;
(b) counting means for counting the number of the frames of said film roll wound by said feed means;
(c) comparing means for generating a comparison output signal when the number of the frames counted by said counting means exceeds said nominal number of the exposures included in said information detected by said detecting means;
(d) monitor means for monitoring a wind state of said film roll wound by said feed means, and for generating a detection output signal upon detecting an abnormal wind state;
(e) control means responsive to said comparing means and said monitor means for generating a first output signal instructing rewinding of said film roll in said cartridge when said detection output signal is generated while said comparison output signal is generated and for generating a second output signal instructing stopping of rotation of said electric motor when said detection output signal is generated while said comparison output signal is not generated; and
(f) display means for displaying, in response to said first output signal of said control means, that said film roll can be rewound.

3. An apparatus according to claim 1 or 2, wherein said feed means includes means for rewinding said film roll toward said cartridge by said electric motor in accordance with said first output signal, and means for stopping said electric motor in accordance with said second output signal.

4. An apparatus according to claim 2, wherein said monitor means monitors a time interval required for winding a unit length of said film roll by said feed means, and generates said detection output signal when the time interval exceeds a predetermined time interval.

5. An apparatus according to claim 2, wherein said monitor means monitors a current which flows into said electric motor, and generates said detection output signal when the monitored current exceeds a predetermined current.

6. An apparatus accoridng to claim 1, wherein said apparatus further includes display means for displaying, in response to said first output signal of said control means, that said film roll can be rewound.

7. An apparatus according to claim 3, wherein said apparatus further includes display means for displaying, in response to said first output signal of said control means, that said film roll is undergoing a rewinding operation.

8. An apparatus according to claim 2, wherein said apparatus further includes display means for displaying, in response to said second output signal of said control means, that a winding operation of said film roll is not normally performed.

* * * * *